May 1, 1956     D. H. CHRISTOPHER ET AL     2,743,548
METHOD OF VAPORIZING A MIXTURE OF ORGANIC
INSECTICIDES IN VENTILATED ROOMS
Filed Feb. 12, 1951
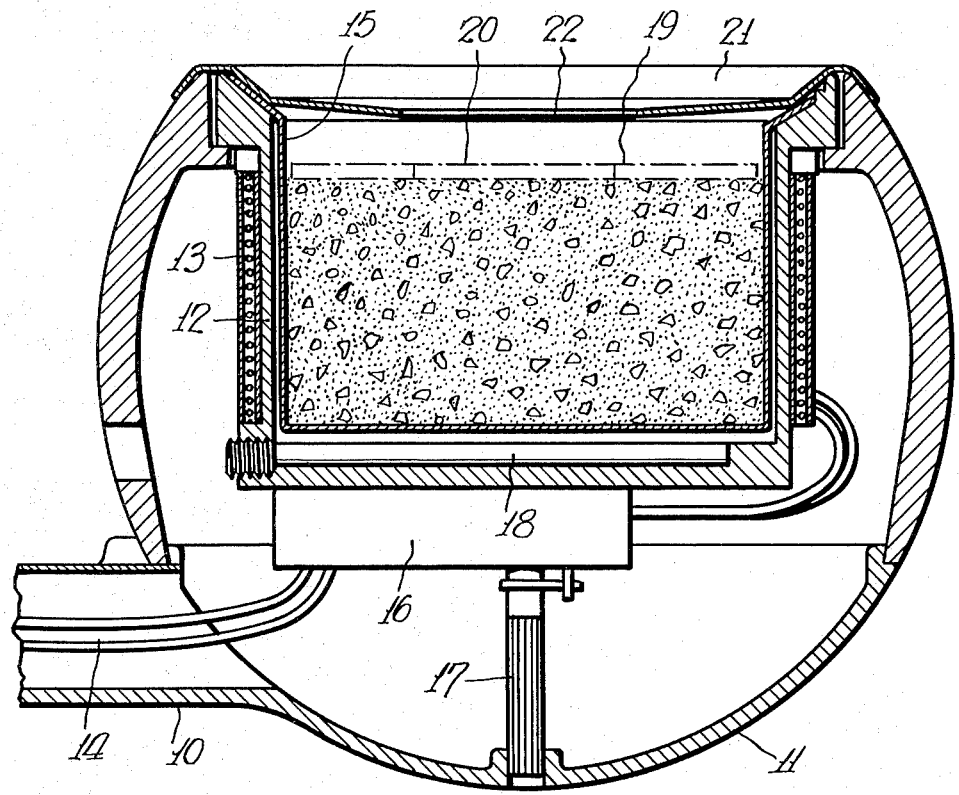
INVENTOR
David H. Christopher
Philip J. Spear
BY
Dean Fairbank & Hirsch
ATTORNEYS

United States Patent Office 2,743,548
Patented May 1, 1956

2,743,548
METHOD OF VAPORIZING A MIXTURE OF ORGANIC INSECTICIDES IN VENTILATED ROOMS

David H. Christopher, Levittown, N. Y., and Philip J. Spear, Amherst, Mass., assignors to American Aerovap, Inc., New York, N. Y., a corporation of New York Application February 12, 1951, Serial No. 210,596

5 Claims. (Cl. 43—129)

This application is a continuation-in-part of our earlier application Serial No. 175,716, filed July 25, 1950, now Patent No. 2,541,637, granted February 13, 1951.

It is among the objects of the invention to attain insect control comparable to that of our earlier application by disseminating, in a ventliated room at extremely slow rate and by heat application, insecticide comprising the chemical known as lindane which is the gamma isomer of hexachloro-cyclohexane of purity better than 99 per cent.

It is among the objects of the invention to attain effective insect control by resort to the generic method of lindane dissemination made the subject of our copending application above identified, but with greater economy by use of materially less of the expensive lindane, to do without diminishing the effective charge by resort to inert filler in order to obviate the objectionable odor incurred during the initial period of operation, to attain more effective residual or deposition action of insecticide than is attained by lindane for greater efficacy against certain crawling insects and to avoid the anticipated progressive resistance developed by insects against organic insecticides.

According to the invention, the lindane is used is admixture with one or more other organic insecticides compatible therewith and particularly with dichloro-diphenyl trichloroethane known as DDT or with dimethoxy-diphenyl trichloroethane known as methoxychlor or with mixtures thereof.

The insecticide is preferably used in thoroughly mixed state in the disseminating equipment.

The greater the proportion of DDT or methoxychlor or combination of the two, admixed with the lindane, the less manifestly is the cost of a given volume of insecticide. While as little as 25 per cent of lindane may be used to as much as 75 per cent of DDT, with useful results, it is more desirable to use not less than 33 per cent of lindane and preferably 50 per cent or more of lindane, the rest being DDT. The insecticide mixed as indicated has certain surprising and unexpected advantages. While the melting point of DDT is considerably lower than that of lindane, it yet has a much lower vapor pressure and is much less volatile than lindane at the temperature at which lindane is desirably volatilized preferably by sublimination. Thus while the melting point of technical DDT is 89° C. and of aerosol type DDT is 103° C., that of lindane is 112° C., yet DDT when heated to less than 125° C., does not become disseminated for even moderate efficacy in commercial insect control, while lindane when heated preferably to about 110° C., or even to temperatures lower than that, will, despite its higher melting point, vaporize by sublimation for effective control more especially of flies and mosquitoes.

It has been discovered that the mixture of lindane and DDT as above indicated, though heated to a temperature no higher than that of lindane used by itself, say to a temperature of 110° to 118° C., will yet effect vaporization of the lindane at effective rate and with the entrainment of DDT with the lindane at rate greater than would be attainable were the DDT used by itself at that temperature.

As a result the lindane is given off preponderantly in the molecular vapor form which is more effective than DDT to kill the insect on the wing by reason of its apparent action as a competitive metabolite, while the DDT with its lower vapor pressure mostly condenses into particles in the aerosol range of size, after having been evaporated, and forms microscopic residue or coating upon the walls, ceilings and the like which is effective not only against winged insects when they alight, but also against crawling insects. Moreover, such deposits have the added advantage that they remain toxic for many hours to insects which may contact them. Thus, the period of effective insect control is extended even though the continuous presence of effective concentrations of air borne toxicants be interrupted by accidental stoppage of electricity or by dilution through the use of forced-draft ventilation.

Another surprising discovery arising from the use of the mixture of lindane and DDT, is that at the given temperature the rate of vapor evolution of lindane becomes restricted as compared to the use of lindane alone and that of the DDT slightly increased as compared to the use of DDT alone at that temperature so that the effective rate of dissemination from the body of mixture of insecticides is comparable to that of the use of lindane alone according to the earlier application above identified.

Thus with considerable economy in the cost of insecticide, insect control comparable to that attained with lindane alone is accomplished and the control of a wider variety of insects is also made possible.

Another surprising consequence of the use of mixture of the insecticides is that in the dissemination by heating according to the invention, there is no apparent trace of musty odor. In some way that we are not able to explain, the mixture of the DDT with lindane eliminates the odor heretofore noted during the first day of use of a fresh batch of lindane.

Another surprising advantage is that while the survivors of populations of insects such as houseflies and mosquitoes subjected to DDT, have been known to develop further generations of more or less resistant insects, and while such ultimate development of immunity though not yet evident in general commercial practice, might be expected even with the use of the highly efficacious lindane, it has been experimentally shown that DDT-resistant flies are susceptible to lindane and that lindane-resistant flies are killed by DDT, and it is believed probable that either the DDT-resistant or the lindane-resistant strains of flies or mosquitoes are killed by such combined insecticides when vaporized in the manner herein disclosed.

It has moreover been discovered that the mixture of lindane and DDT is more deadly by far to a variety of insects, more especially to sand flies than is the use of either of these insecticides alone.

Results comparable to those above set forth are attained when DDT is replaced in the mixture above set forth with methoxychlor which behaves when thus admixed with lindane in much the same way as does DDT. While the lindane evaporates more rapidly than either DDT or methoxychlor when in admixture therewith, it is given off in adequate proportions even after twenty days or more of continuous service.

The vaporization from the mixture of lindane and DDT or methoxychlor, results in a reduced lindane vapor output under practical and extended conditions of use, as compared to the vaporization rate of lindane when used alone.

In practice the insecticide is dispensed from a cup electrically heated to predetermined temperature under thermostatic control to effect dissemination at the desired rate of .2 to 7 grams daily under commercial conditions of use without the slightest toxic effect to human beings or contamination of exposed foods.

As one illustrative example of a mode of carrying out the method of the present invention, there is diagrammatically shown in the drawings an equipment comprising a receptacle 11 containing a heater cup 12, encompassed by an electric heater 13 and fed with current by conductors 14 through the mounting arm 10 for the equipment, and containing the removable cup 15 for the chemical. That cup 15 may be of anodized aluminum or of Pyrex glass. A thermostat 16 illustratively affixed under the bottom of the heater cup 12 may be adjusted by a knob 17 exposed through the bottom of the receptacle 11. A thermometer well 18 extends under the bottom of the removable cup 15.

In carrying out the method with equipment such as just described, the thermostat would preferably be set to maintain a temperature in the well of 110° C. under which condition, as above noted, sublimation is effected from the surface of the lindane in cup 15, which surface maintains the temperature of 75 to 80 degrees C. by reason largely of the high heat of vaporization of the lindane.

A baffle plate 19 (shown in dotted lines because it is infrequently required) rests upon the lindane, snugly fitting the wall of the cup 15 and presenting the central opening 20 which latter, depending upon the degree of reduction in rate of vapor evolution desired, would have a greater or less inner diameter. Thus the baffle part affords control of vapor evolution, alternative or in addition to thermostatic control.

Preferably a ring 21 is removably positioned over the rim of receptacle 11 and serves primarily to shield the surface of the lindane from the effect of drafts, as those from a nearby fan, which would tend to accelerate the desired rate of evaporation. Ring 21 has a central opening 22, which should be sufficiently large for escape of the vapor at desired rate. The main area of disc 21 slopes downward toward opening 22 as shown, and thereby permits crystallized insecticide to fall back into the cup.

As many changes could be made in the above method and equipment, and many apparently widely different embodiments of this invention could be made without departing from the scope of the claims, it is intended that all matter contained in the above description or shown in the accompanying drawings shall be interpreted as illustrative and not in a limiting sense.

Having thus described our invention, what we claim as new and desire to secure by Letters Patent of the United States is:

1. The method of maintaining substantially free from insect life a ventilated room suitable for occupancy by human beings which comprises constantly evaporating thereinto, by controlled application of heat, a mass, the vaporizable components of which consist essentially of a mixture of at least 25 per cent of lindane and another organic insecticide that is solid at room temperature and that has a vapor pressure much lower than that of the lindane.

2. The method of maintaining substantially free from insect life a ventilated room suitable for occupancy by human beings which consists in constantly evaporating thereinto, by controlled application of heat, a mass, the vaporizable components of which consist essentially of a mixture of not less than 25 per cent of lindane and not more than 75 per cent of DDT.

3. The method of maintaining substantially free from insect life a ventilated room suitable for occupancy by human beings which consists in constantly evaporating thereinto by controlled application of heat, a mass the vaporizable components of which consist essentially of a mixture of not less than 50 per cent of lindane and not more than 50 per cent of DDT.

4. The method of maintaining substantially free from insect life a ventilated room suitable for occupancy by human beings, which consists in constantly evaporating thereinto, by controlled application of heat, a mass comprising a mixture of not less than 25 per cent of lindane and not more than 75 per cent of methoxychlor.

5. The method of maintaining substantially free from insect life a ventilated room suitable for occupancy by human beings which consists in constantly evaporating thereinto, by controlled application of heat, a mass comprising a mixture of not less than 50 per cent of lindane and not more than 50 per cent of methoxychlor.

References Cited in the file of this patent

UNITED STATES PATENTS

| | | |
|---|---|---|
| 1,468,842 | Thompson | Sept. 25, 1923 |
| 1,955,963 | Keim | Apr. 24, 1934 |
| 2,321,023 | Goodhue et al. | June 8, 1943 |
| 2,392,372 | Fisher | Jan. 8, 1946 |
| 2,416,256 | Hochberg | Feb. 18, 1947 |
| 2,532,349 | Taylor et al. | Dec. 5, 1950 |
| 2,541,637 | Christopher et al. | Feb. 13, 1951 |

FOREIGN PATENTS

| | | |
|---|---|---|
| 548,853 | Great Britain | Jan. 24, 1947 |
| 639,937 | Great Britain | July 12, 1950 |